3,190,938
POLYMERIZATION OF OLEFINS

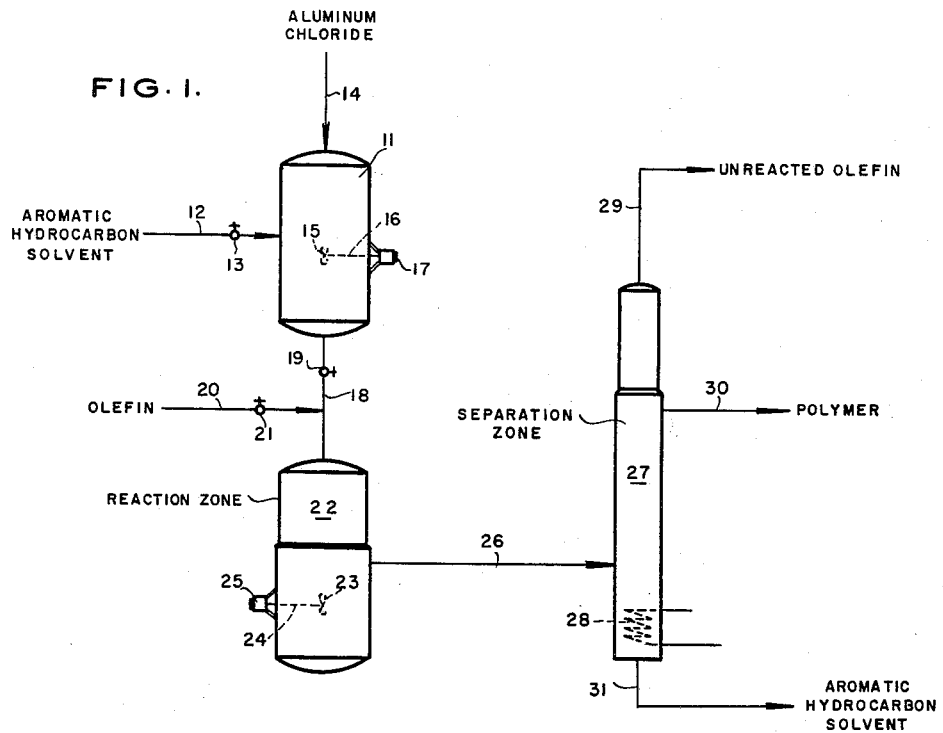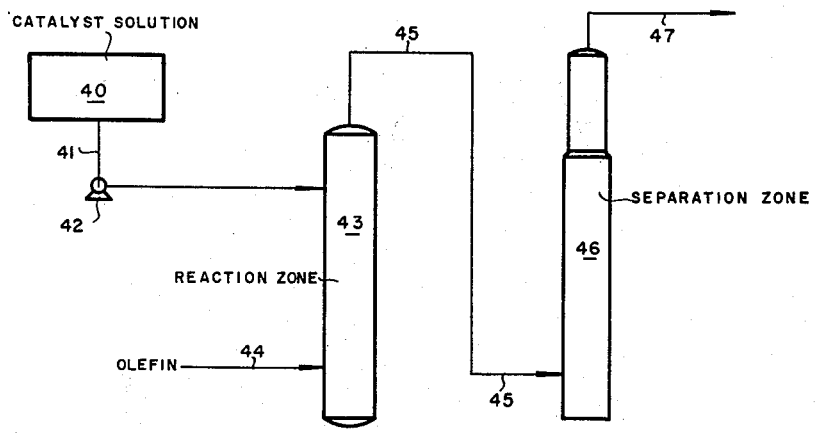

William R. Edwards, Baytown, Tex., assignor, by mesne assignments, to Esso Research and Engineering Company, Elizabeth, N.J., a corporation of Delaware
Filed Nov. 1, 1962, Ser. No. 234,622
9 Claims. (Cl. 260—683.15)

The present invention is directed to the polymerization of olefins. More particularly, the invention is concerned with the polymerization of mono-olefins to form high molecular weight liquid products. In its more specific aspects, the invention is concerned with the polymerization of olefins employing a solution of aluminum chloride in an aromatic hydrocarbon.

The present invention may be briefly described as a method for polymerizing olefins in which mono-olefins having 3 to 10 carbon atoms in the molecule are contacted with a solution of aluminum chloride in an aromatic hydrocarbon under polymerization conditions to form a product containing substantially polymers of the olefins and the aromatic hydrocarbon. The product is separated to recover the polymers and the aromatic hydrocarbon which may then be reused in forming the solution.

The aromatic hydrocarbon employed in the practice of the present invention is suitably an alkyl-substituted aromatic hydrocarbon. The aromatic hydrocarbon may be a single-ring aromatic hydrocarbon, condensed ring, or polynuclear aromatic hydrocarbon. As examples of the aromatic hydrocarbon may be mentioned diethyl-tetramethyl benzene, mesitylene, tetramethyl indan, pentamethyl benzene, pentamethyl ethyl benzene, trimethyl-triethylbenzene, n-propylpentamethyl benzene, tetramethyl tetralin, and the like. The aromatic hydrocarbon may be completely substituted with straight chain alkyl substituents having 1 to 4 carbon atoms in the alkyl group attached to the ring at the terminal carbon atom on the chain. However, for polymerization of mono-olefins other than tertiary olefins, the aromatic hydrocarbon must be completely alkyl substituted. For the polymerization of tertiary olefins, complete alkyl substitution is not required. However, for polymerization of tertiary olefins, the straight chain alkyl-substituted aromatic hydrocarbon must be free of adjacent hydrogens on the ring.

The amount of aluminum chloride employed in the practice of the present invention as a solution in the aromatic hydrocarbon may vary from about 0.1 to about 30 percent by weight of aluminum chloride in the aromatic hydrocarbon solution. A preferred amount is from about 0.1 percent to about 3 percent.

Pressures may range from about 0 to about 500 p.s.i.g., with a preferred pressure range from about 0 to about 50 p.s.i.g.

The ratio of mono-olefins to aromatic hydrocarbon may range from about 0.1 to about 10 volumes. A preferred ratio is from about 0.5 to about 2 volumes.

The contact time of the mono-olefin with the solution may range from about 0.5 to about 180 minutes, with a preferred contact time from about 30 to about 120 minutes.

The present invention will be further described by reference to the drawing in which:

FIG. 1 is a flow diagram of one preferred mode of practicing the invention; and

FIG. 2 is a flow diagram of another preferred mode of the invention.

Referring now to the drawing and particularly to FIG. 1, numeral 11 designates a tank into which aromatic hydrocarbon is introduced by way of line 12, controlled by valve 13. Also introduced into tank 11 is aluminum chloride by way of line 14. Tank 11 is provided with an agitating means 15 which is operated through a shaft 16 connected to a power means, such as an electric motor 17, to agitate the contents of the tank 11 and form a solution of aluminum chloride in aromatic hydrocarbon.

The aluminum chloride solution is withdrawn from the tank 11 by line 18, controlled by valve 19, and then there is introduced into line 18 by way of line 20, controlled by valve 21, a sufficient amount of a mono-olefin. The solution of aromatic hydrocarbon containing mono-olefin is then discharged into a reaction zone 22, provided with an agitator means 23 powered through a shaft 24 by a power means, such as an electric motor 25. On operating the agitating means 23 under suitable temperature and pressure conditions for a sufficient length of time, the mono-olefin is caused to polymerize in the aromatic solution. The reactant solution is then discharged by line 26 into a separation zone 27 which suitably may be a distillation tower or other separation means, as may be desired. In this instance, separation zone 27 is a distillation tower provided with a heating means illustrated by steam coil 28, and with line 29 for removal of unreacted olefins. Line 30 provides for discharge of polymer and line 31 provides for recovery of aromatic hydrocarbon. The unreacted olefin may be returned to zone 22 by line 20 and the aromatic hydrocarbon may be returned to tank 11 by line 12.

The polymer withdrawn by line 30 may be further distilled to separate the polymer by molecular weight and/or boiling point. This polymer is useful for the manufacture of chemicals and may also be used as an ingredient in motor fuels. Specifically, the polymer may be an alkylation feed stock, as may be desired, for production of detergent raw material.

Referring now to FIG. 2, a catalyst solution of aluminum chloride in aromatic hydrocarbon solvent is contained in tank 40 and the aromatic hydrocarbon solution is withdrawn therefrom by line 41 containing pump 42 which introduces the catalytic solution into reaction zone 43, which suitably may be a packed tower or a reaction zone containing bell cap trays and the like, for suitable countercurrent contact between the catalytic solution and the mono-olefin feed introduced by line 44, the catalytic solution and mono-olefin intimately admixing with each other and causing reaction of the mono-olefin under suitable temperature and pressure conditions. Although not shown, the mono-olefin may be suitably heated or cooled, as desired, to provide the proper reaction temperature in zone 43, or a separate heating means may be provided for zone 43.

The reactant solution discharges by line 45 into a separation zone 46, which may be a distillation zone or an adsorption zone such as a silica-gel-containing adsorption zone. The separation zone 46 may comprise a plurality of adsorption towers for separation between the polymer and the aromatic hydrocarbon and for separation of polymers by molecular weight from each other, the product being discharged from zone 46 by line 47 separated into its constituents.

Although not described with respect to the two figures of the drawing, it will be understood that line 26 of FIG. 1 may be provided with an intermediate water and caustic washing zone for removal of aluminum chloride from the reactant solution. Likewise, line 45 may be provided with water-washing and caustic-washing facilities for removal of catalyst.

It is to be understood that separation zones 27 or 46 may include a combination of distillation and adsorption towers and may include a plurality of distillation towers and adsorption towers.

Likewise, other separation means besides distillation and adsorption means may be used to separate aromatic hydrocarbons from the polymer and to separate the polymer into various fractions by molecular weight and/or boiling point.

In order to illustrate the invention further, a number of runs were made in which catalytic solutions were formed of aluminum chloride in various aromatic hydrocarbons. These catalytic solutions were then employed to polymerize various olefins. The results of these runs are shown in Table I which follows:

*Table I*

PENTENE-1 POLYMERIZATIONS—3 HR. REACTION TIME

| Run No. | $AlCl_3$, g. | Olefin, cc. | Aromatic, cc. | Temp., °F. | Conversion | Fraction of Polymer Boiling Below 900° F., Percent |
|---|---|---|---|---|---|---|
| 1 | 3 | 100 | 0 | 32 | 100 | 15 |
| 2 | 3 | 100 | 10 | 32 | 100 | 30 |
| 3 | 3 | 100 | 50 | 32 | 95 | 60 |
| 4 | 3 | 100 | 100 | 32 | 100 | 85 |
| 5 | 3 | 100 | 50 | 80 | 100 | 90 |
| 6 | 3 | 100 | 50 | 150 | 100 | 100 |

CATALYTIC PENTYLENE POLYMERIZATIONS—3 HR. REACTION TIME

| Run No. | $AlCl_3$, g. | Olefin, cc. | Aromatic, cc. | Temp., °F. | Conversion | Product Distribution, Percent | | | |
|---|---|---|---|---|---|---|---|---|---|
| | | | | | | $C_{10}$ | $C_{15}$ | $C_{20}$ | $C_{25}$ |
| 7 | 3 | 100 | 0 | 32 | 100 | 40 | 15 | 10 | 35 |
| 8 | 3 | 100 | 0 | 80 | 60 | 40 | 10 | 10 | 40 |
| 9 | 3 | 100 | 70 | 80 | 100 | 30 | 70 | | |

PENTENE-2 POLYMERIZATIONS—3 HR. REACTION TIME

| 10 | 3 | 100 | 50 | 32 | 50 | 10 | 75 | 15 | |
| 11 | 3 | 100 | 50 | 80 | 70 | 85 | 15 | | |

ISOBUTYLENE POLYMERIZATION—1 HR. REACTION TIME

| 12 | 1 | 100 | 100 | 32 | 100 | Product was in 400–800° F. boiling range |

PROPYLENE POLYMERIZATION—1 HR. REACTION TIME

| Run No. | $AlCl_3$, g. | Olefin, cc. | Aromatic, cc. | Temp., °F. | Conversion | Product Distribution, Percent | | | |
|---|---|---|---|---|---|---|---|---|---|
| | | | | | | $C_{18}$ | $C_{21}$ | $C_{24}$ | $C_{27}$ |
| 13 | 3 | 20 | 100 | 200 | 100 | 5 | 20 | 50 | 25 |

A comparison of Runs 1, 2, 3, and 4 shows the effect of aromatic hydrocarbon in lowering the molecular weight of the product. Also, these runs illustrate the effect of increasing amounts of aromatic hydrocarbon with respect to the amount of aluminum chloride in solution.

A comparison of Runs 3, 5, and 6 illustrates the effect of temperature on the molecular weight of the product.

Considering Runs 7, 8, and 9, these runs illustrate the increased selectivity for polymerization in the presence of the aromatic solvent. Also, these runs illustrate the lowering effect of the aromatic hydrocarbon solvent on the molecular weight of the product.

The remaining runs illustrate polymerization with various olefins.

The polymer products from Runs 2, 3, 4, 5, 6, 9, 10, 11, 12 and 13 were mono-olefins while the polymer product from Runs 1, 7, and 8 contained paraffins and diolefins.

The aromatic hydrocarbon employed in Runs 1 to 11 was diethyl-tetramethyl benzene. Mesitylene was employed in Run 12, and pentamethyl ethyl benzene was employed in Run 13.

The present invention is quite advantageous and useful in that the products may be used for various well-known purposes, such as motor fuels, production of chemicals, alkylation feed stocks, and the like. Particularly, the polymers produced may be used for alkylation to produce materials which on sulfonation and neutralization may be employed as synthetic detergents.

In accordance with the present inventon, it has been found that by properly selecting the aromatic hydrocarbon for preparing an aluminum chloride solution, olefins may be polymerized selectively such that alkylation is suppressed. This is achieved by employing a completely alkyl-substituted aromatic hydrocarbon or one that has no adjacent ring hydrogens. It is preferred that the alkyl ring be completely substituted; although with respect to tertiary olefins, complete alkyl substitution is not required.

The nature and objects of the present invention having been fully described and illustrated and the best mode thereof set forth, what I wish to claim as new and useful and secure by Letters Patent is:

1. A method for polymerizing olefins which comprises contacting a mono-olefin having 3 to 10 carbon atoms in the molecule under polymerization conditions at a temperature within the range from about 32° F. to about 200° F. and a pressure from about 0 to about 500 p.s.i.g. for a time from about 0.5 to about 180 minutes with a solution of about 0.1 to about 30 percent by weight of aluminum chloride in a completely alkyl-substituted aromatic hydrocarbon wherein each of the alkyl groups has a straight chain and has 1 to 4 carbon atoms to form a product containing substantially polymers which are multiples of said olefin and unreacted aromatic hydrocarbon, the volume ratio of mono-olefin to aromatic hydrocarbon being from about 0.1 to about 10.

2. A method in accordance with claim 1 in which the aromatic hydrocarbon is diethyl-tetramethyl benzene.

3. A method in accordance with claim 1 in which the aromatic hydrocarbon is pentamethyl ethyl benzene.

4. A method in accordance with claim 1 in which the aromatic hydrocarbon is tetramethyl indan.

5. A method in accordance with claim 1 in which the olefin is a pentylene.

6. A method in accordance with claim 1 in which the olefin is propylene.

7. A method in accordance with claim 1 in which the olefin is a tertiary olefin.

8. A method in accordance with claim 7 in which the the olefin is isobutylene.

9. A method in accordance with claim 1 in which the aromatic hydrocarbon is tetramethyl tetralin.

References Cited by the Examiner

UNITED STATES PATENTS

| 1,822,358 | 9/31 | Michel | 260—683.15 |
| 2,490,578 | 12/49 | Carmody | 260—683.15 |
| 3,052,741 | 9/62 | De Pierri et al. | 260—671 |

OTHER REFERENCES

Thomas, "Anhydrous Aluminum Chloride in Organic Chemistry," published by Reinhold Pub. Corp., New York (1941) (page 718 relied on).

ALPHONSO D. SULLIVAN, *Primary Examiner.*

PAUL M. COUGHLAN, *Examiner.*